United States Patent [19]

Tomisawa

[11] Patent Number: 4,583,198
[45] Date of Patent: Apr. 15, 1986

[54] COMPUTER PROGRAM RUN-AWAY SUPERVISORY CIRCUIT AND METHOD

[75] Inventor: Naoki Tomisawa, Isesaki, Japan

[73] Assignee: Japan Electronic Control Systems Company, Limited, Japan

[21] Appl. No.: 459,575

[22] PCT Filed: May 6, 1981

[86] PCT No.: PCT/JP82/00156
§ 371 Date: Jan. 4, 1983
§ 102(e) Date: Jan. 4, 1983

[87] PCT Pub. No.: WO82/03929
PCT Pub. Date: Nov. 11, 1982

[30] Foreign Application Priority Data

May 6, 1981 [JP] Japan ............................ 56-067952

[51] Int. Cl.[4] ........................................... G06F 11/00
[52] U.S. Cl. ............................. 364/900; 364/431.11
[58] Field of Search ............... 371/19, 12; 364/200, 364/900, 300, 431.11, 426, 565

[56] References Cited

U.S. PATENT DOCUMENTS

| | | | |
|---|---|---|---|
| 3,427,443 | 2/1969 | Apple et al. | 371/19 |
| 3,623,007 | 11/1971 | Eckhart et al. | 364/200 |
| 4,072,852 | 2/1978 | Hogan et al. | 371/12 |
| 4,126,895 | 11/1978 | Weemaes et al. | 364/200 |
| 4,140,202 | 2/1979 | Noddings et al. | 364/426 |
| 4,410,938 | 10/1983 | Higashiyama | 364/431.11 |
| 4,410,991 | 10/1983 | Lenart | 371/12 |

Primary Examiner—Gareth D. Shaw
Assistant Examiner—Daniel K. Dorsey
Attorney, Agent, or Firm—Lowe, Price, LeBlanc, Becker & Shur

[57] ABSTRACT

A program run-away supervisory circuit for a microcomputer which generates a run signal each time prescribed steps are executed in a re-circulating program includes run signal discriminating frequency is above a predetermined frequency and below a preselected frequency, such that the predetermined frequency is greater than the preselected frequency.

6 Claims, 2 Drawing Figures

COMPUTER PROGRAM RUN-AWAY SUPERVISORY CIRCUIT AND METHOD

TECHNICAL ART

The present invention relates to computer program run-away supervisory circuits and methods, and more particularly to a circuit for and method of detecting computer run-away in response to the computer deriving a run signal at an excessively high frequency.

BACKGROUND OF THE INVENTION

Microcomputers are frequently used as controllers for equipment or apparatus, et cetera. For example, in an internal combustion engine of the fuel injection type, a microcomputer is used to calculate the amount of fuel to be injected into the engine in accordance with various engine parameters. In this case, to calculate the amount of fuel to be injected it is necessary for a microcomputer to repeat prescribed operations many times during a short time period. Such repetitive operations are performed in response to program stored in a memory of the microcomputer; however, since the capacity of the memory to store the programs is desirably as small as possible, the programs are carried out in compliance with the steps of a prescribed circulating range.

However, in such a microcomputer, no countermeasures for noises, temperature or the like are normally taken in contrast to the measures taken with large computers. Consequently, malfunctions occur such that operations are performed without the program operating through the normal sequence thereof; in particular, program run-away may occur depending upon surrounding circumstances. Because of the possibility of program run-away, such microcomputers are frequently constructed to derive a run signal each time a prescribed step of a re-circulating section (re-circulating program) of the program is executed. The run signal confirms whether or not the microcomputer is operating according to the program. There is a known program run-away supervisory circuit for preventing program run-away by resetting the operation of the microcomputer; program run-away is detected in response to this run signal.

In a conventional program run-away supervisory circuit, program run-away is detected by the presence/absence of a run signal being generated in a prescribed time. It is possible to detect such a program run-away if no run signal is generated because the execution step of the microcomputer has jumped to a step out of a re-circulating program. However, if there is program run-away such that only a part of the steps including the above-mentioned prescribed step in the re-circulating program are performed, program run-away is not detected since the run signal is generated.

It is an object of the present invention to provide a program run-away supervisory circuit and method which can always and accurately detect a program run-away.

DISCLOSURE OF THE INVENTION

The program run-away supervisory circuit according to the invention is characterized by a run signal discriminating means for generating a program run-away signal in response to the run signal being in a frequency bank outside of the normal frequency band for derivation of the run signal.

The program run-away supervisory circuit of the invention is characterized by a run signal discriminating means comprising frequency-voltage converter means for generating a voltage representing the frequency at which a run signal is generated, and a window comparator for generating a program run-away signal when the output voltage of the frequency-voltage converter is out of a prescribed voltage range.

BEST MODE FOR PRACTICING INVENTION

The features and advantages of the present invention will be better understood from the following description taken in conjunction with the accompanying drawings.

Figure 1:
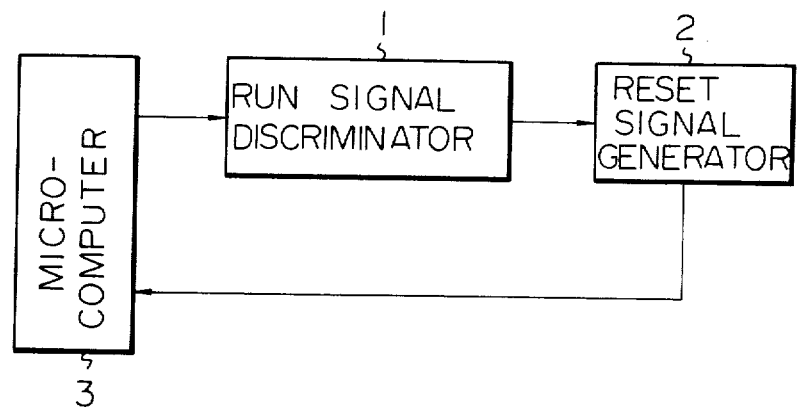
FIG. 1 is a block diagram of an exemplary conventional program run-away supervisory circuit.

FIG. 1 is a block diagram of an exemplary conventional program run-away supervisory circuit. In the drawing, a program run-away supervisory circuit comprises a run signal discriminator 1 and a reset signal generator 2. Generator 2 responds to the output of the run signal discriminator 1. The run signal discriminator 1 is connected to respond to a run signal at an output terminal of microcomputer 3. Reset signal generator 2 is connected to supply a reset signal to a reset terminal of the microcomputer 3.

When a run signal is derived by the microcomputer 3 in a prescribed time, the run signal discriminator 1 determines that the microcomputer 3 is operating in compliance with the program. However, if no run signal is derived by microcomputer 3 in a prescribed time, discriminator 1 determines that program run-away has occurred, and generates a program run-away signal. This program run-away signal activates reset signal generator 2 to reset the operation of the microcomputer 3.

In such a program run-away supervisory circuit, it is possible to detect program run-away if no run signal is generated because the execution steps of the microcomputer 3 has jumped to steps out of the re-circulating program. However, the prior art circuit does not accurately detect program run-away if only a part of the steps including the above-mentioned prescribed steps in the re-circulating program are continuously performed. This is because the run signal is generated and detected by discriminator 1.

Figure 2:
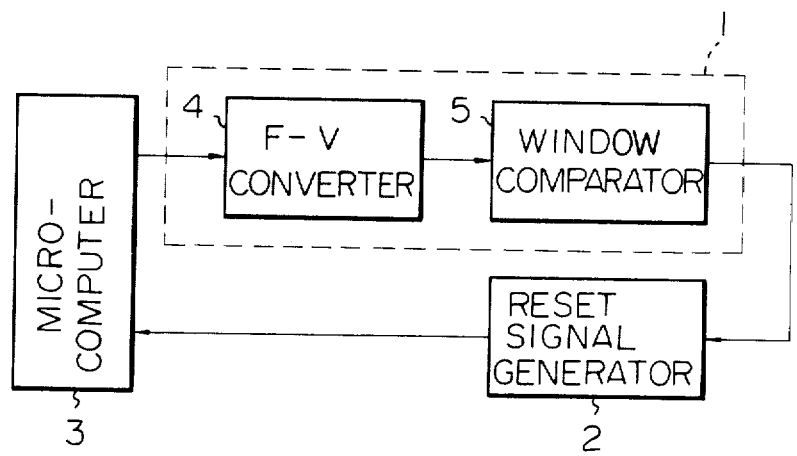
FIG. 2 is a block diagram of an embodiment of a program run-away supervisory circuit of the present invention.

FIG. 2 is a block diagram of a program run-away supervisory circuit according to the present invention. In FIG. 2, the run signal output terminal of the microcomputer 3 is connected to a F-V (frequency-voltage) converter 4, having an output connected to an input of window comparator 5. Two predetermined voltages $Vref_1$ and $Vref_2$ (where, $Vref_1 < Vref_2$) are supplied to window comparator 5. Window comparator 5 derives an output that is supplied to an input of reset signal generator 2. A reset signal generated by the reset signal generator 2 is supplied to the reset terminal of the microcomputer 3.

In such a program run-away supervisory circuit with the above-stated construction, when a run signal is derived from the microcomputer 3, the F-V converter 4 derives a voltage representing the run signal generating frequency. Window comparator 5 derives a program run-away signal when the voltage supplied to it by converter 4 is smaller than the prescribed voltage $Vref_1$ and larger than the prescribed voltage $Vref_2$. Therefore, if the microcomputer 3 correctly operates in compliance with the program, the run signals are generated in a predetermined time period, causing the output voltage of the F-V converter 4 to be between the prescribed voltages $Vref_1$ and $Vref_2$. However, if no run signal is generated when the microcomputer 3 executes the steps other than the re-circulating program due to program run-away, the output voltage of the F-V converter 4 is smaller than the prescribed voltage $Vref_1$, causing the window comparator 5 to generate a program run-away signal. When the microcomputer 3 continuously performs only a part of the steps in the circular program the run signal is generated at a higher frequency than that in normal operation, causing the output voltage of the F-V converter 4 to be larger than $Vref_2$. Window comparator 5 responds to the output of converter 4 being greater than $Vref_2$ to generate a program runaway signal. In response to the generated program runaway signal at the output of comparator 5 reset signal generator 2 supplies a reset signal to the microcomputer 3, causing the operation of the microcomputer 3 to return to the start status.

As described above, in accordance with the program run-away supervisory circuit of the present invention, a program run-away signal is generated when the run signal generating frequency is out of prescribed frequency bands. For this purpose, the microcomputer continuously executes only a part of the steps in the re-circulating program; it is possible to detect such a program run-away because the run signal generating frequency is higher than a value normally associated therewith.

I claim:

1. A program run-away supervisory circuit for a computer which derives run pulses, each run pulse being derived as a prescribed step in a re-circulating program is executed by the computer, whereby the run pulses are derived with a repetition frequency equal to the execution frequency of the program, the circuit including:
    a frequency-voltage converter responsive to the run pulses for generating an output voltage having a magnitude representative of the repetition frequency of the run pulses;
    a window comparator including means for generating a program-run-away signal in response to the output voltage of said frequency-voltage converter having a value associated with a frequency exceeding a predetermined frequency; and
    a reset signal generator for deriving a reset signal for said computer in response to derivation of said program-run-away signal, said reset signal resetting the computer to a predetermined portion of the re-circulating program.

2. The circuit of claim 1 wherein the window comparator further includes means for generating the program-run-away signal in response to the output voltage of said converter having a value associated with a frequency less than a preselected frequency which is less than the predetermined frequency.

3. In combination,
    a computer including means for deriving run pulses, each run pulse being derived as a prescribed step in a re-circulating program is executed by the computer whereby the run pulses are derived with a repetition frequency equal to the execution frequency of the program,
    a program run-away supervisory circuit for the computer responsive to the derived run pulses, the circuit including:
    a frequency-voltage converter responsive to the run pulses for generating an output voltage having a magnitude representative of the repetition frequency of the run pulses,
    a window comparator including means for generating a program-run-away signal in response to the output voltage of said frequency-voltage converter having a value associated with a frequency exceeding a predetermined frequency; and
    a reset signal generator for resetting the computer in response to the generated program-run-away signal, said reset signal resetting the computer to a predetermined portion of the re-circulating program.

4. The combination of claim 3 wherein the window comparator further includes means for generating the program-run-away signal in response to the output voltage of said converter having a value associated with a frequency less than a preselected frequency which is less than the predetermined frequency.

5. A method of controlling a computer in a run-away mode, said computer deriving run pulses as a prescribed step in a re-circulating program, whereby the run pulses are derived with a repetition frequency equal to the execution frequency of the program, comprising the steps of:
    detecting the occurrence rate of the run pulses as exceeding a predetermined rate, the predetermined rate being greater than the rate at which the run pulses are derived while the program is operating normally;
    detecting the occurrence rate of the run pulses as being less than a preselected rate, the preselected rate being less than the rate at which the run pulses are derived while the program is operating normally; and
    resetting the computer to a predetermined portion of the re-circulating program in response to the occurrence rate of the run pulses exceeding the predetermined rate and being less than the preselected rate.

6. The method of claim 5 wherein the computer is reset to a start status.

* * * * *